US012762537B2

(12) United States Patent
Rule et al.

(10) Patent No.: US 12,762,537 B2
(45) Date of Patent: Oct. 13, 2026

(54) DEVICES AND METHODS FOR SELECTIVE CONTACTLESS COMMUNICATION

(71) Applicant: Capital One Services, LLC, McLean, VA (US)

(72) Inventors: Jeffrey Rule, Chevy Chase, MD (US); Kaitlin J. Newman, Washington, DC (US); Wayne David Lutz, Fort Washington, MD (US); Kevin Grant Osborn, Newton Highlands, MA (US); Paul Moreton, Tuscaloosa, AL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 19/554,571

(22) Filed: Mar. 2, 2026

(65) Prior Publication Data

US 2026/0203745 A1 Jul. 16, 2026

Related U.S. Application Data

(60) Continuation of application No. 19/084,274, filed on Mar. 19, 2025, now Pat. No. 12,567,057, which is a
(Continued)

(51) Int. Cl.
*G06Q 20/34* (2012.01)
*G06Q 20/32* (2012.01)
*G06Q 20/38* (2012.01)

(52) U.S. Cl.
CPC ....... *G06Q 20/352* (2013.01); *G06Q 20/3226* (2013.01); *G06Q 20/353* (2013.01); *G06Q 20/3829* (2013.01); *G06Q 2220/123* (2013.01)

(58) Field of Classification Search
CPC ............. G06Q 20/352; G06Q 20/3226; G06Q 20/353; G06Q 20/3829; G06Q 2220/123
(Continued)

(56) References Cited

U.S. PATENT DOCUMENTS 5,590,038 A 12/1996 Pitroda
5,666,415 A 9/1997 Kaufman
(Continued)

FOREIGN PATENT DOCUMENTS

CN 101192295 A 6/2008
GB 2516861 A 2/2015
(Continued)

OTHER PUBLICATIONS

Isaac et al. "Secure Mobile Payment Systems", IT Pro, May/Jun. 2014, IEEE, pp. 36-43 (Year: 2014).*
(Continued)

*Primary Examiner* — James D Nigh
(74) *Attorney, Agent, or Firm* — TROUTMAN PEPPER LOCKE LLP; Christopher J. Forstner; John A. Morrissett

(57) ABSTRACT

A card having an antenna, one or processors, and memory having stored thereon a first application and a second application configured to receive an input of the card and determine a request associated with the input. The card is further configured to activate, responsive to determining that the request is consistent with a contactless EuroPay-MasterCard-Visa (EMV) data standard, the first application. The first application is configured to communicate, via near field communication (NFC), data to the communicating device via the antenna based on the EMV data standard for payment purposes. The card is further configured to activate, responsive to determining that the request is consistent with a near field communication data exchange format (NDEF) standard, the second application. The second application is configured to communicate, via NFC, data to the communicating device via the antenna based on the NDEF standard for verification/identification purposes.

20 Claims, 5 Drawing Sheets

Related U.S. Application Data continuation of application No. 18/922,235, filed on Oct. 21, 2024, now Pat. No. 12,260,393, which is a division of application No. 18/407,210, filed on Jan. 8, 2024, now Pat. No. 12,125,021, which is a continuation of application No. 18/310,097, filed on May 1, 2023, now Pat. No. 11,868,988, which is a continuation of application No. 17/960,301, filed on Oct. 5, 2022, now Pat. No. 11,682,001, which is a continuation of application No. 17/836,834, filed on Jun. 9, 2022, now Pat. No. 11,468,428, which is a continuation of application No. 16/848,063, filed on Apr. 14, 2020, now Pat. No. 11,397,941, which is a continuation of application No. 16/223,403, filed on Dec. 18, 2018, now Pat. No. 10,664,830.

(58) Field of Classification Search
USPC .......................................................... 705/71
See application file for complete search history.

(56) References Cited

U.S. PATENT DOCUMENTS

| | | | |
|---|---|---|---|
| 6,199,114 | B1 | 3/2001 | White |
| 6,324,271 | B1 | 11/2001 | Sawyer |
| 6,367,011 | B1 | 4/2002 | Lee |
| 6,572,015 | B1 | 6/2003 | Norton |
| 7,252,242 | B2 | 8/2007 | Ho |
| 7,270,276 | B2 | 9/2007 | Vayssiere |
| 7,287,692 | B1 | 10/2007 | Patel |
| 7,374,099 | B2 | 5/2008 | de Jong |
| 7,527,208 | B2 | 5/2009 | Hammad |
| 7,568,631 | B2 | 8/2009 | Gibbs |
| 7,584,153 | B2 | 9/2009 | Brown |
| 7,628,322 | B2 | 12/2009 | Holtmanns |
| 7,793,851 | B2 | 9/2010 | Mullen |
| 7,801,799 | B1 | 9/2010 | Brake, Jr. |
| 7,908,216 | B1 | 3/2011 | Davis |
| 7,922,082 | B2 | 4/2011 | Muscato |
| 8,010,405 | B1 | 8/2011 | Bortolin |
| 8,074,877 | B2 | 12/2011 | Mullen |
| 8,082,450 | B2 | 12/2011 | Frey |
| 8,108,687 | B2 | 1/2012 | Ellis |
| 8,186,602 | B2 | 5/2012 | Itay |
| 8,196,131 | B1 | 6/2012 | Von Behren |
| 8,249,654 | B1 | 8/2012 | Zhu |
| 8,276,814 | B1 | 10/2012 | Davis |
| 8,332,272 | B2 | 12/2012 | Fisher |
| 8,346,670 | B2 | 1/2013 | Hasson |
| 8,511,547 | B2 | 8/2013 | Rans |
| 8,519,822 | B2 | 8/2013 | Riegebauer |
| 8,750,514 | B2 | 6/2014 | Gallo |
| 8,870,081 | B2 | 10/2014 | Olson |
| 9,038,893 | B2 | 5/2015 | Kirkham |
| 9,129,199 | B2 | 9/2015 | Spodak |
| 9,183,490 | B2 | 11/2015 | Moreton |
| 9,275,325 | B2 | 3/2016 | Newcombe |
| 9,286,606 | B2 | 3/2016 | Diamond |
| 9,306,753 | B1 | 4/2016 | Vandervort |
| 9,501,776 | B2 | 11/2016 | Martin |
| 9,710,744 | B2 | 7/2017 | Wurmfeld |
| 9,949,065 | B1 | 4/2018 | Zarakas |
| 9,965,632 | B2 | 5/2018 | Zarakas |
| 9,965,911 | B2 | 5/2018 | Wishne |
| 9,977,890 | B2 | 5/2018 | Alberti |
| 9,978,056 | B2 | 5/2018 | Seo |
| 9,978,058 | B2 | 5/2018 | Wurmfeld |
| 9,990,795 | B2 | 6/2018 | Wurmfeld |
| 10,007,873 | B2 | 6/2018 | Heo |
| 10,013,693 | B2 | 7/2018 | Wyatt |
| 10,121,130 | B2 | 11/2018 | Pinski |
| 10,210,505 | B2 | 2/2019 | Zarakas |
| 10,242,368 | B1 | 3/2019 | Poole |
| 10,296,910 | B1 | 5/2019 | Templeton |
| 10,332,102 | B2 | 6/2019 | Zarakas |
| 10,360,557 | B2 | 7/2019 | Locke |
| 10,380,471 | B2 | 8/2019 | Locke |
| 10,395,244 | B1 * | 8/2019 | Mossler ............ G06Q 20/3226 |
| 10,453,054 | B2 | 10/2019 | Zarakas |
| 10,474,941 | B2 | 11/2019 | Wurmfeld |
| 10,475,027 | B2 | 11/2019 | Guise |
| 10,482,453 | B2 | 11/2019 | Zarakas |
| 10,482,457 | B2 | 11/2019 | Poole |
| 10,489,774 | B2 | 11/2019 | Zarakas |
| 10,489,781 | B1 | 11/2019 | Osborn |
| 10,510,070 | B2 | 12/2019 | Wurmfeld |
| 10,515,361 | B2 | 12/2019 | Zarakas |
| 10,535,068 | B2 | 1/2020 | Locke |
| 10,546,444 | B2 | 1/2020 | Osborn |
| 10,581,611 | B1 | 3/2020 | Osborn |
| 10,664,830 | B1 | 5/2020 | Rule |
| 10,685,349 | B2 | 6/2020 | Brickell |
| 10,797,882 | B2 | 10/2020 | Rule |
| 10,880,741 | B2 | 12/2020 | Zarakas |
| 10,909,525 | B1 | 2/2021 | Dhodapkar |
| 10,970,691 | B2 | 4/2021 | Koeppel |
| 10,984,416 | B2 | 4/2021 | Ilincic |
| 11,037,136 | B2 | 6/2021 | Rule |
| 11,062,098 | B1 | 7/2021 | Bergeron |
| 11,120,453 | B2 | 9/2021 | Rule |
| 11,138,593 | B1 | 10/2021 | Ho |
| 11,138,605 | B2 | 10/2021 | Aabye |
| 11,176,540 | B2 | 11/2021 | Gupta |
| 11,188,908 | B2 | 11/2021 | Locke |
| 11,216,806 | B2 | 1/2022 | Mossler |
| 11,297,958 | B2 | 4/2022 | Vukich |
| 11,315,114 | B2 * | 4/2022 | Locke ............. G06K 19/07749 |
| 11,334,872 | B2 | 5/2022 | Phillips |
| 11,361,173 | B2 | 6/2022 | Edwards |
| 11,392,933 | B2 | 7/2022 | Mossler |
| 11,392,935 | B2 | 7/2022 | Suresh |
| 11,416,844 | B1 | 8/2022 | Osterkamp |
| 11,423,392 | B1 | 8/2022 | Ho |
| 11,443,292 | B2 | 9/2022 | Sherif |
| 11,444,770 | B2 | 9/2022 | Wieker |
| 11,461,764 | B2 | 10/2022 | Rule |
| 11,481,764 | B2 | 10/2022 | Shakkarwar |
| 11,521,213 | B2 | 12/2022 | Rule |
| 11,551,200 | B1 | 1/2023 | Cook |
| 11,556,918 | B2 | 1/2023 | Mestre |
| 11,615,395 | B2 | 3/2023 | McHugh |
| 11,777,933 | B2 | 10/2023 | Moreton |
| 2003/0220876 | A1 | 11/2003 | Burger |
| 2005/0156026 | A1 | 7/2005 | Ghosh |
| 2005/0228997 | A1 | 10/2005 | Bicker |
| 2005/0269402 | A1 | 12/2005 | Spitzer |
| 2007/0276765 | A1 | 11/2007 | Hazel |
| 2008/0082452 | A1 | 4/2008 | Wankmueller |
| 2008/0099552 | A1 | 5/2008 | Grillion |
| 2009/0143104 | A1 | 6/2009 | Loh |
| 2009/0235339 | A1 | 9/2009 | Mennes |
| 2009/0282264 | A1 | 11/2009 | Amiel |
| 2011/0113245 | A1 | 5/2011 | Varadarajan |
| 2011/0155801 | A1 | 6/2011 | Rowberry |
| 2012/0143703 | A1 | 6/2012 | Wall |
| 2013/0030997 | A1 | 1/2013 | Spodak |
| 2013/0146657 | A1 | 6/2013 | Graef |
| 2013/0211937 | A1 | 8/2013 | Elbirt |
| 2013/0311363 | A1 | 11/2013 | Ramaci |
| 2014/0074637 | A1 | 3/2014 | Hammad |
| 2014/0074655 | A1 | 3/2014 | Lim |
| 2014/0081785 | A1 | 3/2014 | Valadas Preto |
| 2014/0365377 | A1 | 12/2014 | Salama |
| 2015/0032635 | A1 | 1/2015 | Guise |
| 2015/0073983 | A1 | 3/2015 | Bartenstein |
| 2015/0113271 | A1 | 4/2015 | Jooste |
| 2015/0134513 | A1 | 5/2015 | Olson |
| 2015/0199673 | A1 | 7/2015 | Savolainen |
| 2015/0199863 | A1 | 7/2015 | Scoggins |
| 2015/0254637 | A1 | 9/2015 | Yang |
| 2015/0317295 | A1 | 11/2015 | Sherry |
| 2016/0078430 | A1 | 3/2016 | Douglas |
| 2016/0189143 | A1 | 6/2016 | Koeppel |

(56) References Cited

U.S. PATENT DOCUMENTS

| | | | |
|---|---|---|---|
| 2016/0253651 | A1 | 9/2016 | Park |
| 2016/0277383 | A1 | 9/2016 | Guyomarc'h |
| 2016/0277388 | A1 | 9/2016 | Lowe et al. |
| 2016/0307189 | A1 | 10/2016 | Zarakas |
| 2016/0314472 | A1 | 10/2016 | Ashfield |
| 2016/0379217 | A1 | 12/2016 | Hammad |
| 2017/0017957 | A1 | 1/2017 | Radu |
| 2017/0039566 | A1 | 2/2017 | Schipperheijn |
| 2017/0068950 | A1 | 3/2017 | Kwon |
| 2017/0330173 | A1 | 11/2017 | Woo |
| 2018/0039987 | A1 | 2/2018 | Molino |
| 2018/0268132 | A1 | 9/2018 | Buer |
| 2018/0300716 | A1 | 10/2018 | Carlson |
| 2019/0172055 | A1 | 6/2019 | Hale |
| 2019/0303945 | A1 | 10/2019 | Mitra |
| 2021/0004806 | A1 | 1/2021 | Noe |
| 2021/0272098 | A1 | 9/2021 | Delsuc |
| 2021/0304189 | A1 | 9/2021 | Gupta |
| 2021/0383360 | A1 | 12/2021 | Sinha |
| 2021/0406869 | A1 | 12/2021 | Pathrabe |
| 2022/0114581 | A1 | 4/2022 | Upadhye |
| 2022/0284416 | A1 | 9/2022 | Rule |
| 2022/0309509 | A1 | 9/2022 | Akgun |
| 2022/0335412 | A1 | 10/2022 | Rule |
| 2022/0366410 | A1 | 11/2022 | Rule |
| 2022/0398566 | A1 | 12/2022 | Rule |
| 2022/0414648 | A1 | 12/2022 | Rule |
| 2023/0054157 | A1 | 2/2023 | Mao |
| 2023/0065163 | A1 | 3/2023 | Vargas |
| 2023/0083785 | A1 | 3/2023 | Maiman |
| 2023/0169505 | A1 | 6/2023 | Rule |
| 2023/0354020 | A1 | 11/2023 | Rule |
| 2023/0359839 | A1 | 11/2023 | Lovgren |

FOREIGN PATENT DOCUMENTS

| | | | |
|---|---|---|---|
| GB | 2551907 | A | 1/2018 |
| KR | 20150140132 | A | 12/2015 |
| WO | 9910824 | A1 | 3/1999 |
| WO | 0049586 | A1 | 8/2000 |
| WO | 2011089423 | A2 | 7/2011 |
| WO | 2013155562 | A1 | 10/2013 |
| WO | 2015183818 | A1 | 12/2015 |
| WO | 2017047855 | A1 | 3/2017 |
| WO | 2019022585 | A1 | 1/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

Emvco: "EMV Card Personalisation Specification", Aug. 1, 2021, pp. 1-114, Retrieved from the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Kavi Dhokia, "Tap to Activate Your Debit Card," Nov. 14, 2017; retrieved from https://monzo.com/blog/2017/11/14/nfc-card-activation.

* cited by examiner

DEVICES AND METHODS FOR SELECTIVE CONTACTLESS COMMUNICATION

CROSS-REFERENCE TO RELATED APPLICATIONS

This application is a continuation of, and claims priority under 35 U.S.C. § 120 to, U.S. patent application Ser. No. 19/084,274, which issues Mar. 3, 2026, as U.S. Pat. No. 12,567,057, filed Mar. 19, 2025, which is a continuation of U.S. patent application Ser. No. 18/922,235, now U.S. Pat. No. 12,260,393, filed Oct. 21, 2024, which is a divisional of U.S. patent application Ser. No. 18/407,210, now U.S. Pat. No. 12,125,021, filed Jan. 8, 2024, which is a continuation of U.S. patent application Ser. No. 18/310,097, now U.S. Pat. No. 11,868,988, filed May 1, 2023, which is a continuation of U.S. patent application Ser. No. 17/960,301, now U.S. Pat. No. 11,682,001, filed Oct. 5, 2022, which is a continuation of U.S. patent application Ser. No. 17/836,834, now U.S. Pat. No. 11,468,428, filed Jun. 9, 2022, which is a continuation of U.S. patent application Ser. No. 16/848,063, now U.S. Pat. No. 11,397,941, filed Apr. 14, 2020, which is a continuation of U.S. patent application Ser. No. 16/223,403, now U.S. Pat. No. 10,664,830, filed on Dec. 18, 2018, the entire contents of each of which are fully incorporated herein by reference.

FIELD

The presently disclosed subject matter relates generally to contactless communication devices configured to communicate with other devices and, more particularly, to contactless cards configured to selectively communicate different types of data and/or using different protocols to different types of other devices.

BACKGROUND

Contactless cards may be used for many purposes including for payment, access, or identification. For example, some types of contactless cards, including contactless credit cards, are configured to communicate with a payment terminal to transmit payment data when purchasing an item or making a payment. It may be advantageous to configure such payment contactless cards, including contactless credit cards, to also enable communication of identification data (or perform other authentication functions) with a mobile device or another computing device distinct from a payment transaction with a payment terminal, such as when a user is logging into an application on the mobile device to access a secured feature or payment function. Care should be taken, however, to distinguish between the different uses or functions of the contactless card and to limit the communications to only the data required for each use or function between the contactless card and the device.

Accordingly, the present disclosure is directed to embodiments of contactless cards, devices, and related methods configured to provide selective communications for improving data security of the communications when capable of communicating with different devices and/or for different functions.

SUMMARY

Aspects of the disclosed technology include devices and methods for a card capable of selective communications with a plurality of device types. Consistent with the disclosed embodiments, certain methods may utilize one or more communicating devices (e.g., mobile device, point-of-sale terminal device) and one or more contactless devices (e.g., radio frequency identification (RFID) cards). A method may include a first connection established between a card and a first device. After a data format of the first connection is determined to be a first data format, a first application of the card transmits payment data. The method may further include a second connection established between the card and a second device. After a data format of the second connection is determined to be a second data format, a second application of the card transmits identification data.

In some embodiments, the first device is a point-of-sale device and the first data format corresponds to a EuroPay-MasterCard-Visa (EMV) data standard. According to some embodiments, the second device is a mobile device, and the second data format corresponds to a near field communication data exchange format (NDEF) data standard. In the disclosed embodiments, the method may further include the card communicating with the mobile device and/or the point-of-sale device by using near field communication (NFC). The card may have a radio frequency identification (RFID) chip. Communication between the card and the device may occur when the RFID chip of the card is within an NFC range of a digital reader. The card may receive, from the mobile device, one or more instructions to generate a digital signature. In response, the card may generate the digital signature. The digital signature may be generated using a private key of a key pair or other secret. The card may transmit the digital signature to the mobile device.

In some embodiments, a card may have an antenna, one or more processors, and a memory storing instructions along with a first application and a second application. The card may receive and/or transfer data to a communicating device. Optionally, the card may include a sensor configured to detect, in cooperation with the antenna, an input of the card from a communicating device. Regardless of how the card input of the card is received, the card may be configured to determine a format (e.g., a data format) of the input in response to detecting the input of the card. In some embodiments, a data format may be determined from the input itself, in other embodiments, a data format may be determined based on an identifier associated with the first or second application, or any other indicia from which the data format may be determined. In response to determining the data format is a EuroPay-MasterCard-Visa (EMV) data standard, the card may be configured to activate the first application. The first application may be configured to communicate, via NFC, payment data to the communicating device via the antenna based on the EMV data standard. In response to determining the data format is a NDEF data standard, the processor may activate the second application. The second application may be configured to communicate, via NFC, identification data to the communicating device via the antenna based on the NDEF standard. The card may be a contactless payment card, contactless identification card, or any device capable of transmitting data through an NFC standard and/or an EMV standard. The card may be configured to send only one of the payment data and the identification data to a single communicating device. The first application may be unable to access the identification data and the second application may be unable to access the payment data.

In some embodiments, the card may further include a radio frequency identification (RFID) chip. In those embodiments, the communicating device may be a mobile device. The second application may be configured to communicate with the mobile device using the NFC standard when the RFID chip is within an NFC range of a digital reader associated with the mobile device. The second application may also transmit a public key of a key pair of the card to the mobile device and receive, from the mobile device, one or more instructions to generate a digital signature. The second application may further generate the digital signature using a private key of the key pair of the card and transmit the digital signature to the mobile device.

In further embodiments, a card may have an antenna, a radio frequency identification (RFID) chip, one or more processors, and a memory having a first application and a second application. The sensor may be configured to detect an input of the card via the antenna. The first application may be configured to communicate with a first device based on a first format of the input. The second application may be configured to communicate with a second device based on a second format of the input. The card may be configured to prevent communication between the first application and the second application. The card may be a contactless payment, contactless identification card, or any device capable of transmitting data through an NDEF data standard and/or an EMV data standard. The first format may be a EuroPay-MasterCard-Visa (EMV) data standard. The card may be configured to communicate, by the first application and through the EMV data standard, with the first device, which may be a point-of-sale device. The card may be further configured to transmit payment data, by the first application, and to the point-of-sale device. The second format may be a NDEF data standard. The card may be configured to communicate, by the second application and through the NDEF data standard, with the second device, which may be a mobile device. The card may be further configured to transmit identification data, by the second application, and to the mobile device.

In some embodiments, the second application may be further configured to communicate with the mobile device using the NDEF data standard when the RFID chip is within an NFC range of a digital reader associated with the mobile device. The second application may also transmit a public key of a key pair of the card to the mobile device and receive, from the mobile device, one or more instructions to generate a digital signature. The second application may generate the digital signature using a private key of the key pair of the card and transmit the digital signature to the mobile device.

In an exemplary use case, a cardholder may seek to make a payment with his credit card (e.g., contactless payment card). The cardholder may present the card at a merchant where the card is tapped against a point-of-sale device. The card may determine the device type as being a point-of-sale device. Accordingly, the card may transmit, from an application according to a communication protocol associated with the point-of-sale device, only the payment data to the point-of-sale device. When the payment data is received by the point-of-sale device, the data is used to make a transaction authorization decision. In this instance, the payment is approved, and the cardholder is able to complete his purchase.

Further features of the disclosed design, and the advantages offered thereby, are explained in greater detail hereinafter with reference to specific example embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. The disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

Figure 1A:
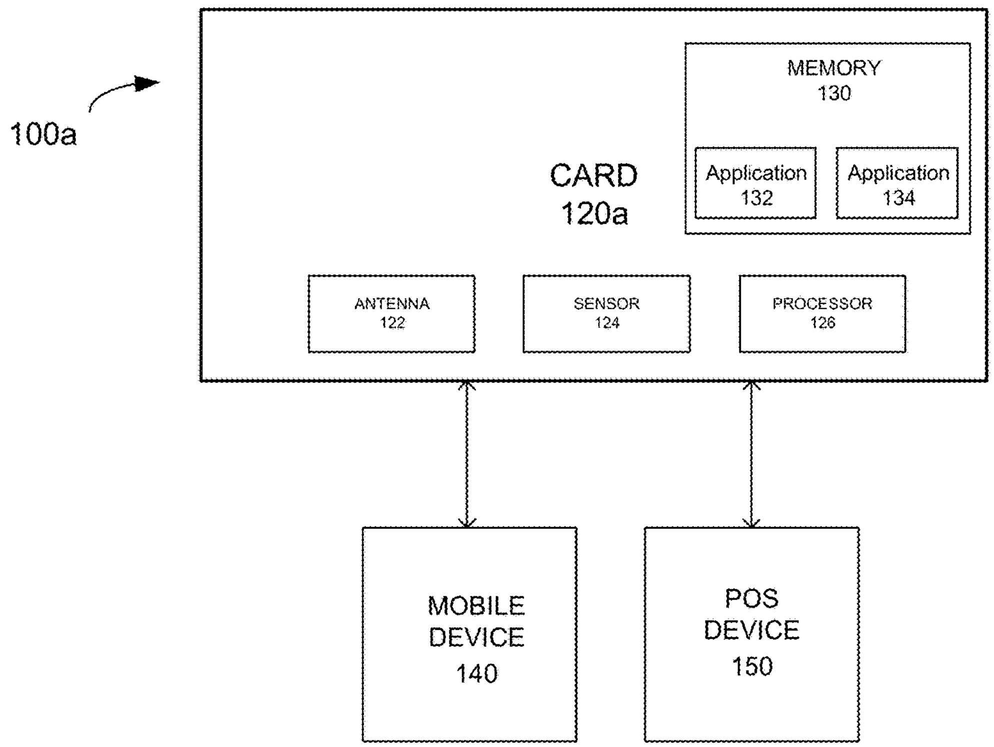
FIGS. 1A-B are diagrams of an example environment that may be used to implement one or more embodiments of the present disclosure.
Figure 1B:
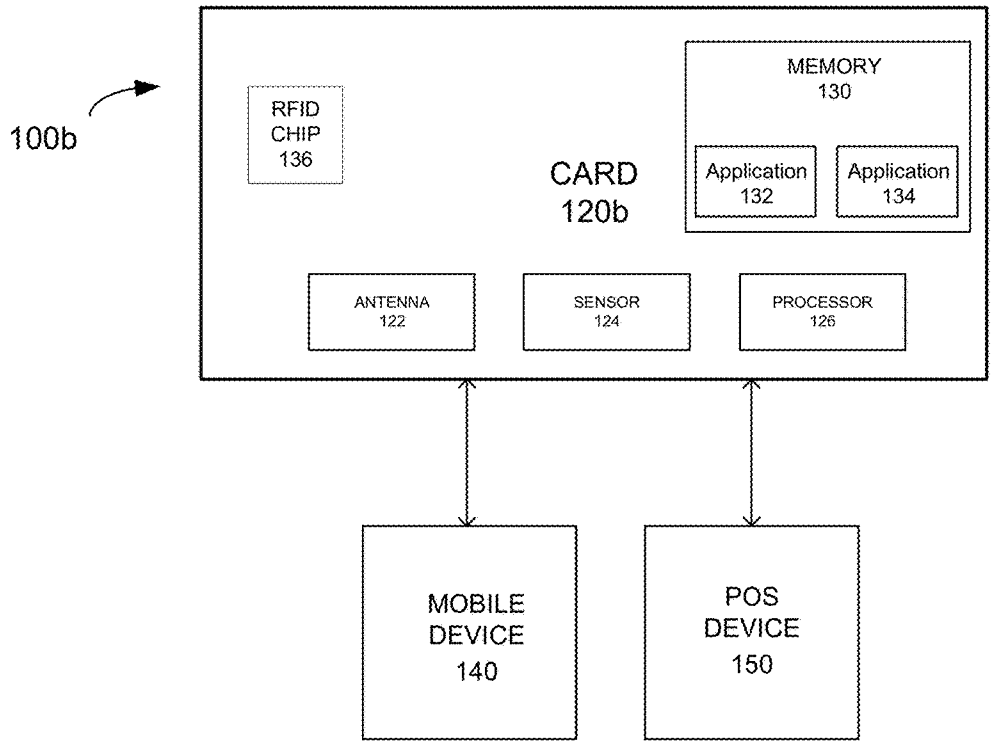

FIGS. 1A-B show an example environment 100*a* and 100*b*, respectively, that may implement certain aspects of the present disclosure. The components and arrangements shown in FIGS. 1A-B are not intended to limit the disclosed embodiments as the components used to implement the disclosed processes and features may vary. As shown in FIGS. 1A-B, in some embodiments, the environment 100*a-b* includes a mobile device 140, a point-of-sale device 150, and a card 120 which includes an antenna 122, a sensor 124, one or more processors 126 and a memory 130 having thereon a first application 132 and a second application 134. In some embodiments, card 120*b* may include a radio frequency identification (RFID) chip 136. As non-limiting examples, the mobile device 140 may be a smartphone, a laptop computer, a tablet, or other personal computing device. The mobile device 140 may run and display one or more applications and the related output(s) of the one or more applications (e.g., through APIs). The mobile device 140 may include a card reader or one or more components that may function to read from and/or communicate with a card (e.g., a digital card reader). In conjunction with the one or more applications, the card reader communicates with the one or more cards 120_b_ (e.g., RFID cards). An example computer architecture that may be used to implement one or more of the mobile device 140 and the point-of-sale device 150 is described below with reference to FIG. 5.

In certain embodiments, the cards 120_a_ and 120_b_ may be configured to receive an input from a communicating device (e.g., mobile device 140, point-of-sale device 150). The input may include a request for data from the card 120_a-b_. The input may include a request to establish communication with the card 120_a-b_. The sensor 124 may detect the input, e.g., by detecting specific input sequences. In detecting the input, the sensor 124 may receive the input via the antenna 122. For example, in some embodiments, an application executing on mobile device 140 may communicate with a card 120 after a card reader of the mobile device is brought sufficiently near the card 120 so that NFC data transfer is enabled between the mobile device 140 and the card 120. For communications involving card contact, the contact plates of the EMV chip may be involved in detecting the input. Detecting the input in contactless card communications may involve the communications method defined in ISO 14443. The one or more processors 126 may determine a format (e.g., data format) of the input. For example, the format may be an NDEF data standard, a EuroPay-Master-Card-Visa (EMV) data standard, and/or the like. In some cases, the communication between the card 120_a-b_ and the communicating device may be through application protocol data units (APDUs).

According to some example embodiments consistent with the present disclosure, communication with cards 120_a_ and 120_b_ may involve Application Protocol Data Units (APDUs). When an application is selected, specific APDU messages are exchanged. For example, in EMV, there are various certificate exchanges, and requests for signing transaction data. For RFID type applications, the application is selected, and then File select and then File read commands are sent.

In response to receiving data consistent with an EMV data standard, the one or more processors 126 may activate the first application 132. As a non-limiting example, the one or more processors 126 may include a state machine with various transitions governed by the outcome of authenticity tests at various states. If the received data is consistent with the EMV standard, the data will pass an authentication check for the EMV standard, and the state machine may move to a state where the first application 132 is activated. Activating the first application 132 may include initiating communication directly and/or indirectly between the first application 132 and the point-of-sale device 150. Once activated, the first application 132 may communicate, via NFC, payment data to the point-of-sale device 150. Payment data may include a cardholder's information (e.g., first name, last name, address), card information (e.g., card number, expiration date, security code), and/or details of the transaction (e.g., transaction amount, merchant name). In some embodiments, the first application 132 is configured for communicating payment data specifically to payment terminals or other point-of-sale devices based on the EMV standard. In some embodiments, the first application 132 (or an additional application) may communicate identification data using similar EMV based techniques to non-point-of-sale devices for identification or authentication purposes without initiating a payment transaction, as described for example, in U.S. patent application Ser. No. 16/135,954, filed Sep. 19, 2018 titled "System and Methods for Providing Card Interactions," the contents of which are expressly incorporated by reference herein in its entirety.

In response to receiving data consistent with an NDEF data standard, the one or more processors 126 may activate the second application 134. As a non-limiting example, the one or more processors 126 may include a state machine with various transitions governed by the outcome of authenticity tests at various states. If the received data is consistent with the NDEF standard, the data will pass an authentication check for the NDEF standard, and the state machine may move to a state where the second application 134 is activated. In some embodiments, the received data may include a read request, such as an NFC read, of an NDEF tag, which may be created in accordance with the NDEF data standard. For example, a reader of the mobile device 140 may transmit a message, such as an applet select message, with an applet ID of an NDEF producing applet stored on the card 120. Processors 126 may thus determine that the form of the input is consistent with an NDEF request based on the applet ID or other indicia for example. Data consistent with an NDEF standard may be formatted in a modified form of Type Length Value (TLV) encoding with specific Type bytes encoding various parts of the NDEF message. NFC NDEF information is conveyed in a single NDEF message which can be broken into records. In some embodiments, each record may be further broken into multiple parts. Activating the second application 134 may include initiating communication directly and/or indirectly between the second application 134 and the mobile device 140. Once activated, the second application 134 may communicate, via NFC, identification data to the mobile device 140. Identification data may include any data used to verify or authenticate identity. For example, identification data may include a cryptogram or signature associated with the card 120. Further, identification data may, but need not include any actual identification information of the user. In some embodiments, identification data transmitted via NFC Data Exchange Format One True Pairing (NDEF OTP) may be used to validate an online transaction with an entered card number without requiring a merchant payment system for EMV.

In some embodiments, the card 120_b_ may include a radio frequency identification (RFID) chip 136. The card 120_a-b_ may communicate with the mobile device 140 when the card 120_a-b_ is within an NFC range of a digital reader of the mobile device 140. More specifically, the second application 134 may communicate directly and/or indirectly with the mobile device 140. In some embodiments, communication may involve transmitting a public key of a key pair of the card 120_b_ to the mobile device 140. The card 120_b_ may receive from the mobile device 140 one or more instructions to generate a digital signature. Using a private key of the key pair of the card 120_b_, the second application 134 may generate the digital signature. The card 120_b_ may transmit the digital signature to the mobile device 140, based on which card 120_b_ (and/or its user) may be authenticated. In some embodiments, the card 120_b_ may receive a request from the mobile device 140 (e.g. from an application on the mobile device configured to transmit the request) comprising an instruction to generate a cryptogram, from which the card 120_b_ may be authenticated. For example, the cryptogram may be a message authentication code (MAC) cryptogram as described in U.S. patent application Ser. No. 16/205,119, filed on Nov. 29, 2018, titled "Systems and Methods for Cryptographic Authentication of Contactless Cards," the contents of which are expressly incorporated by reference herein in its entirety.

The cards 120*a-b* may be configured to send only one of the payment data and the identification data to a single communicating device (e.g., mobile device 140, point-of-sale device 150). For example, cards 120*a-b* may isolate the payment data and the identification data from different applications (e.g., first and second applications 132 and 134). Accordingly, when the first application 132 is activated, a first set of data is available for transmission and when the second application 134 is activated, a second set of data is available for transmission. Further, the first application 132 may be unable to access the identification data and the second application may be unable to access the payment data. According to some embodiments, the cards 120*a-b* may transmit only payment data or only identification data based on a request from point-of-sale device 150 or mobile device 140, respectively.

Turning to the mobile device 140, in some embodiments, the mobile device 140 may include a digital card reader and/or one or more applications. The mobile device 140 may be configured to transmit an input to the card 120*a-b*. The input may provide data indicative of a particular data exchange format. For example, the data may be consistent with data transmitted in an EMV data standard, an NDEF data standard, and/or other comparable data exchange standards. For example, the mobile device 140 may communicate, via NFC, and based on the NDEF data standard with the second application 134. The mobile device 140 may receive identification data from the card 120*a-b*. The mobile device 140 may receive a public key of a key pair of the card 120*b*. In response, the mobile device 140 may transmit one or more instructions to generate a digital signature to the card 120*b*. The mobile device 140 may receive the generated digital signature from the card 120*b*.

The point-of-sale device 150 may include one or more of a monitor, one or more processors, and a digital reader capable of performing NFC. The point-of-sale device 150 may communicate, via NFC and based on the EMV data standard, with the first application 132. The point-of-sale device 150 may receive payment data from the card 120*a-b*.

Figure 2:
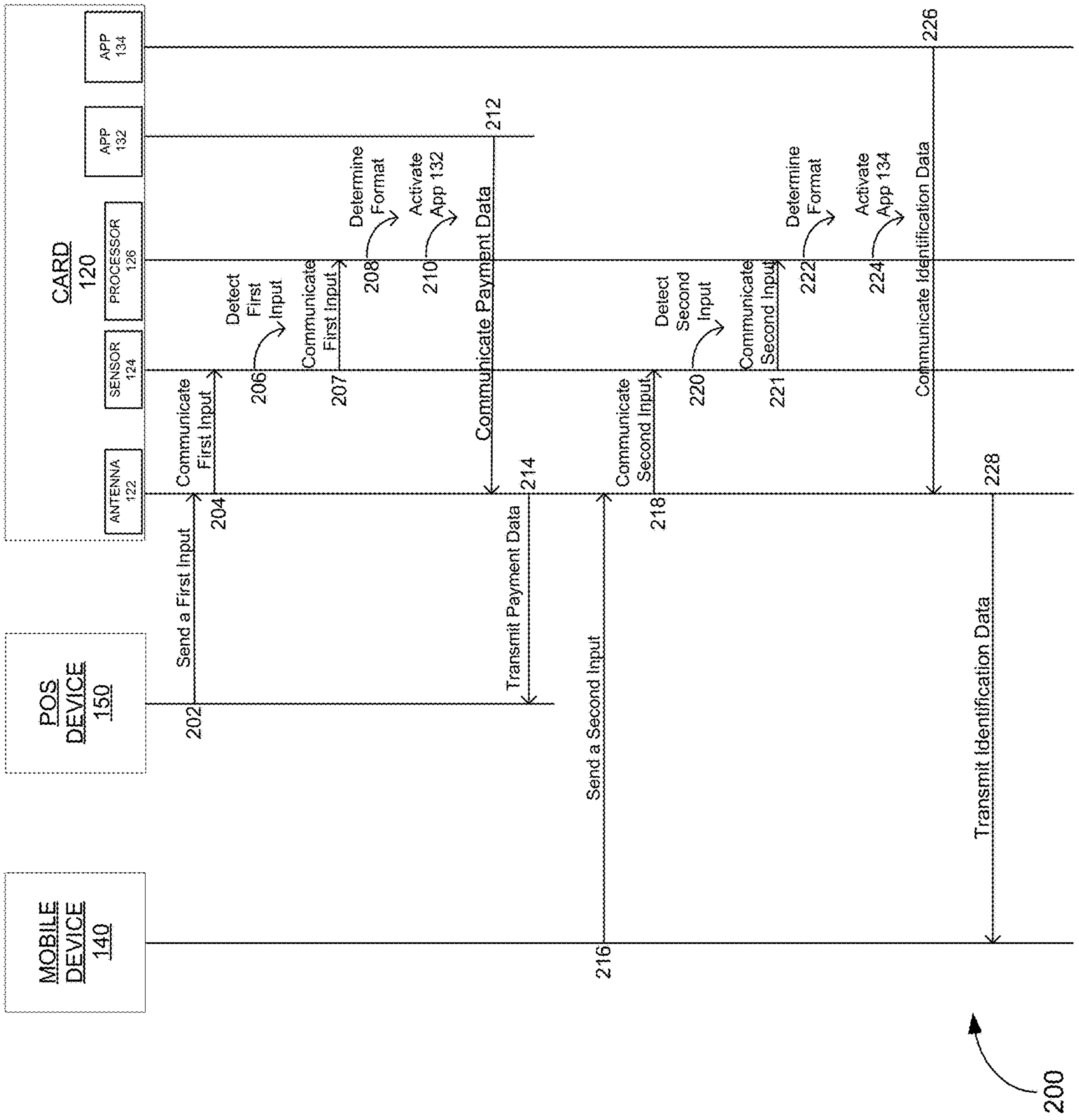
FIG. 2 is a timing diagram providing selective communications with a plurality of device types according to an example embodiment.

FIG. 2 is a timing diagram of providing selective communications with a plurality of device types. According to some embodiments, at 202, the point-of-sale device 150 may send a first input (e.g. communication, request, etc.) to the card 120*a*. The antenna 122 may receive the first input. The input may be indicative of a data format (e.g., EMV data standard). At 204, the antenna 122 may communicate the first input to the sensor 124. The sensor 124 may detect the first input at 206 (e.g., by differentiating the input from noise), and communicate the existence of the first input with the processor 126 at 207. At 208, the processor(s) 126 may determine the format of the input. In some embodiments, a program (e.g., an applet) associated with the processor(s) 126 can determine the format of the input based on an identification activation sequence. Such the identification activation sequence may be used to select a specific application for activation. In response to determining that the format of the received data is consistent with an EMV data standard, at 210, the processor 126 activates the first application 132. Activating the first application 132 may involve establishing communication between the processor 126 and the first application 132. Further, the processor(s) 126 may communicate the input and/or the data format to the first application 132. At 212, the first application 132 may communicate the payment data, for output, to the antenna 122. In some embodiments, prior to transmitting payment data to the point-of-sale device 150, the card 120 verifies the point-of-sale device 150 by exchanging digital signatures and establishing trust with the point-of-sale device 150 via Certificate Authority (CA) chains. At 214, the antenna 122 transmits the payment data the point-of-sale device 150. In some embodiments, as discussed above, a first application 132 may also be configured to communicate for non-payment purposes, such as for authentication or identification, to a non-point-of-sale device, such as mobile device 140, using the EMV data standard.

At 216, the mobile device 140 may send a second input to the card 120*a*. The antenna 122 receives the second input. The input may be indicative of a data format (e.g., an NDEF data standard). At 218, the antenna 122 may communicate the second input to the sensor 124. The sensor 124 detects the second input at 220 (e.g., by differentiating the input from noise), and communicates the existence of the second input with the processor 126 at 221. Detecting the input may involve deciphering the input from the mobile device 140 such that the data format is at least recognized by the card 120*a*. At 222, the processor(s) 126 may determine the format of the input. At 224, in response to determining that the format is consistent with a contactless NDEF data standard, the processor 126 activates the second application 134. Activating the second application 134 may involve establishing communication between the processor(s) 126 and the second application 134. Further, the processor(s) 126 may communicate the input and/or the data format to the second application 134. At 226, the second application 134 may communicate the identification data, for output, to the antenna 122. At 228, the antenna 122 transmits the identification data the mobile device 140.

In an example scenario, a customer or user is seeking to pay a merchant who is using a smartphone (e.g., mobile device 140) equipped with a digital reader. The customer taps his credit card (e.g., 120*a-b*) against the merchant's smartphone such that NFC communication is established. The smartphone may be equipped with a payment application requiring both identification data and payment data in order to process a transaction. The credit card receives an input from the smartphone. The input includes data consistent with an NDEF data standard. Responsive to determining data consistent with the NDEF data standard, the credit card transmits identification data to the smartphone. The smartphone verifies the cardholder's identity and then sends a second input consistent with an EMV data standard. After determining the EMV data standard, the credit card transmits payment data to the smartphone. The smartphone verifies the payment information and completes the transaction.

Figure 3:
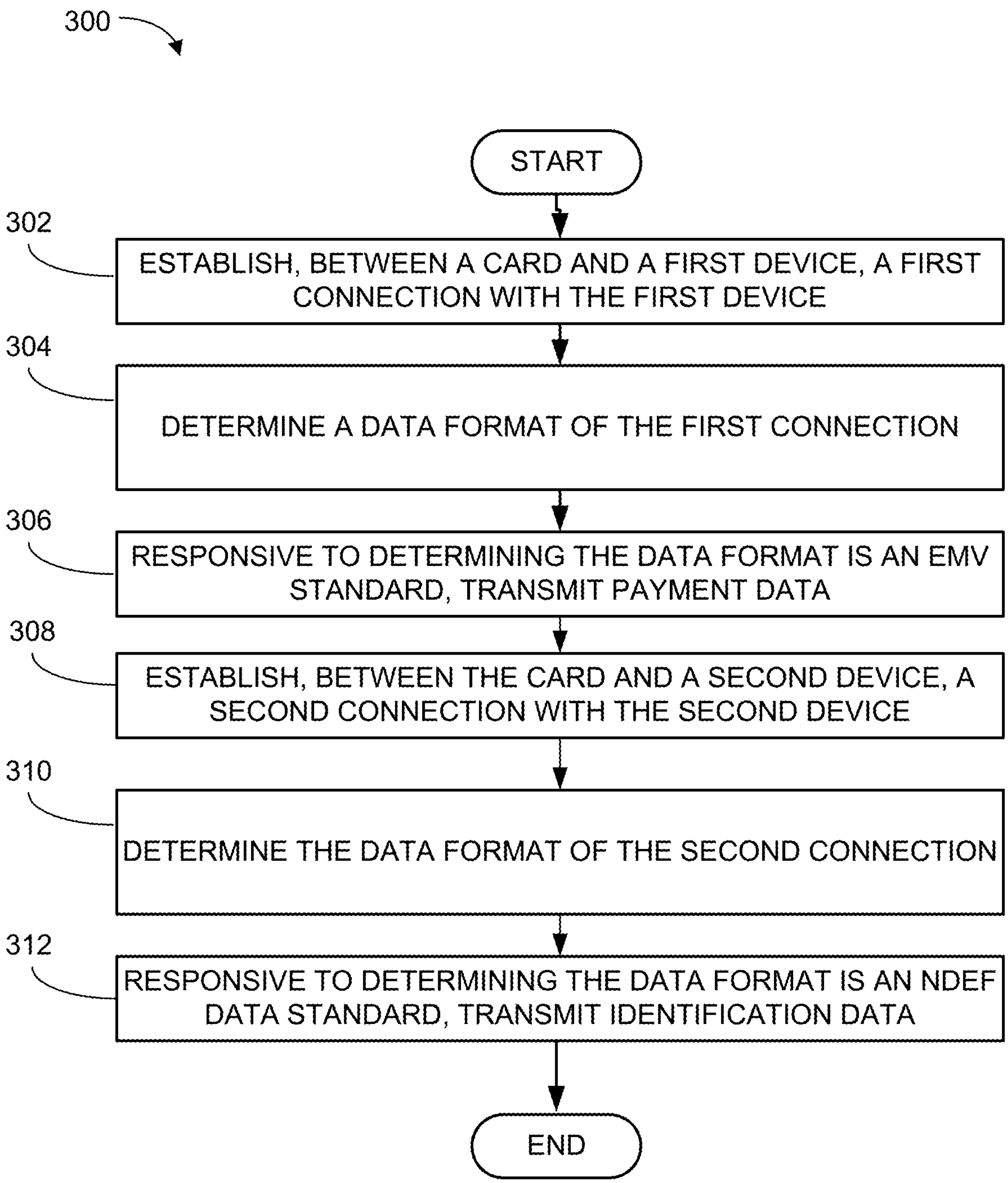
FIG. 3 is a flow chart of a method providing selective communications with a plurality of device types according to an example embodiment.

FIG. 3 is a flow chart of a method providing selective communications with a plurality of device types. At 302, a first connection between the card 120*a-b* and the first device (e.g., point-of-sale device 150) is established. Establishing a first connection between the card 120*a-b* and the point-of-sale device 150 may involve bringing the card 120*a-b* within an NFC range of a digital reader of the point-of-sale device 150. Establishing a first connection may further involve receipt of an input by the card 120*a-b* from the point-of-sale device 150. At 304, the data format of the first connection may be determined by the processor 126. The data format of the first connection may be consistent with an EMV data standard, an NDEF data standard, or another data standard capable of transmitting data via an NFC. For example, the processor 126 determines the data format of the first connection is consistent with an EMV data standard. At 306, in response to determining the data format is consistent with an EMV data standard, the card 120*a-b* transmits the payment data to the point-of-sale device 150. In some embodiments, the first application 132 may output, for transmission, the payment data to the point-of-sale device 150.

At 308, a second connection between the card 120*a-b* and the second device (e.g., mobile device 140) is established. Establishing a second connection between the card 120*a-b* and the mobile device 140 may involve bringing the card 120*a-b* within an NFC range of a digital reader of the mobile device 140. Establishing a second connection may further involve receipt of an input by the card 120*a-b* from the mobile device 140. At 310, the data format of the second connection may be determined by the processor 126. The data format of the second connection may be consistent with an EMV data standard, an NDEF data standard, or another data standard capable of transmitting data via an NFC. Here, the processor 126 determines the data format of the second connection is consistent with an NDEF data standard. At 312, in response to determining the data format is consistent with an NDEF data standard, the card 120*a-b* transmits the identification data to the mobile device 140. In some embodiments, the second application 134 may output, for transmission, the identification data to the mobile device 140.

Figure 4:
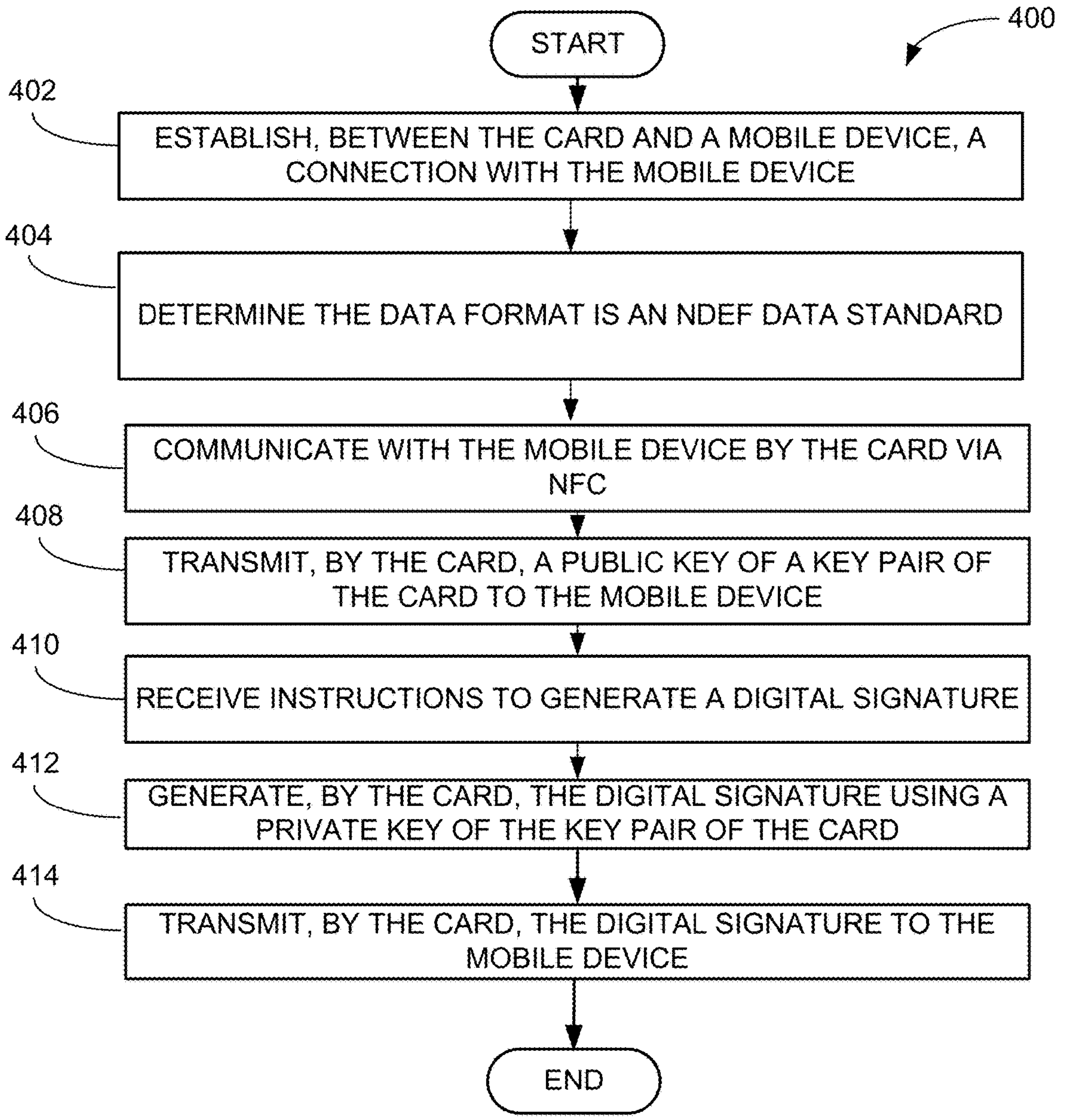
FIG. 4 is a flow chart of a method providing selective communications with a certain device type according to an example embodiment.

FIG. 4 is a flow chart of a method providing selective communications with a certain device type. The method described herein involves a card 120*a-b* and a mobile device 140 and further details certain steps in authenticating identification information. At 402, a connection between the card 120*a-b* and the mobile device 140 is established. The connection may be established when the card 120*a-b* is placed within an NFC range of a digital reader associated with the mobile device 140. At 404, the processor 126 may determine the data format of the connection is consistent with an NDEF data standard. At 406, the card 120*a-b* may further communicate with the mobile device 140 via NFC. The communication may be used to authenticate the identification data of the card 120*a-b*. At 408, the card 120*a-b* transmits a public key of a key pair of the card 120*a-b* to the mobile device 140. At 410, the card 120*a-b* receives instructions to generate a digital signature from the mobile device 140. Based on the received instructions from the mobile device 140, the card 120*a-b* generates a digital signature using a private key of the key pair of the card 120*a-b*, at 412. In some cases, the identification information may be incorporated within the digital signature or otherwise conveyed with the digital signature. At 414, the card 120*a-b* transmits the digital signature to the mobile device 140. In some embodiments, the digital signature may be any form of cryptogram based on a secret known by the card 120*a-b* and/or generated by the card 120*a-b*, not necessarily a private key of a key pair. For example, any cryptographic technique for reliably verifying the authenticity of card 120*a-b* may be used.

Figure 5:
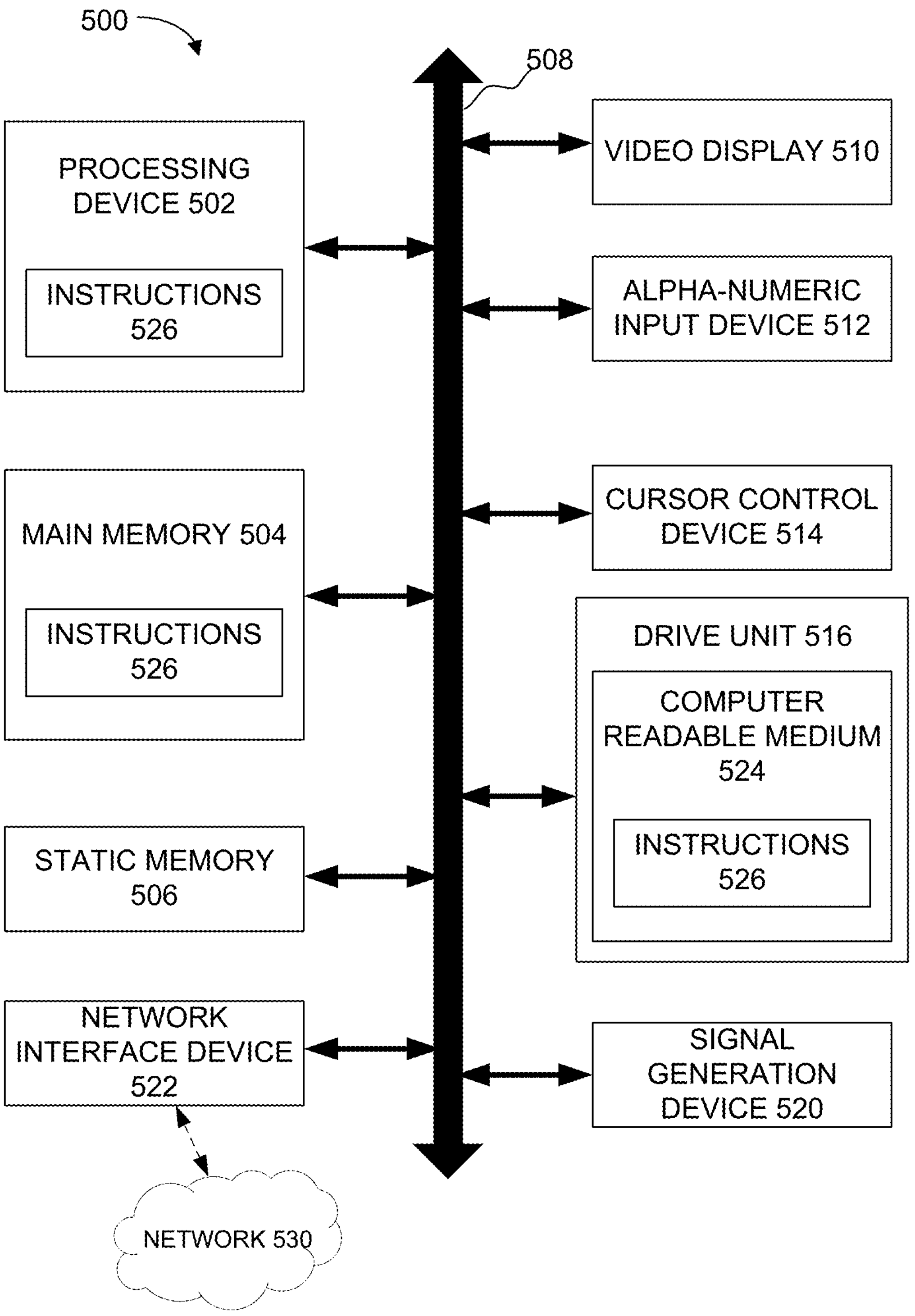
FIG. 5 is a block diagram of an example computer system that may implement certain aspects of the present disclosure.

FIG. 5 is a block diagram of an example computer system 500 that may implement certain aspects of the present disclosure. The computer system 500 may include a set of instructions 526 for controlling operation of the computer system 500. In some implementations, the computer system 500 may be connected (e.g., networked) to other machines in a Local Area Network (LAN), an intranet, an extranet, a satellite communications system, or the Internet. The computer system 500 may operate in the capacity of a server or a client machine in a client-server network environment, or as a peer machine in a peer-to-peer (or distributed) network environment. The computer system 500 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single computer system 500 is illustrated, the term "machine" shall also be taken to include any collection of machines (e.g., computers) that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random-access memory (DRAM) such as synchronous DRAM (SDRAM), etc.), a static memory 506 (e.g., flash memory, static random-access memory (SRAM), etc.), and a secondary memory 516 (e.g., a data storage device), which communicate with each other via a bus 508.

The processing device 502 represents one or more general-purpose processing devices such as a microprocessor, a microcontroller, a central processing unit, or the like. As non-limiting examples, the processing device 502 may be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the operations for electronically creating and trading derivative products based on one or more indices relating to volatility.

The computer system 500 may further include a network interface device 522, which is connectable to a network 530. The computer system 500 also may include a video display unit 510, i.e., a display (e.g., a liquid crystal display (LCD), a touch screen, or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a non-transitory storage medium 524 on which is stored one or more sets of instructions 526 for the computer system 500 representing any one or more of the methodologies or functions described herein. For example, the instructions 526 may include instructions for implementing an asset tracking device including a power source and power management system or subsystem for a container or a trailer. The instructions 526 for the computer system 500 may also reside, completely or at least partially, within the main memory 504 and/or within the processing device 502 during execution thereof by the computer system 500, the main memory 504 and the processing device 502 also constituting computer-readable storage media.

While the storage medium 524 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following example use cases describe examples of particular implementations of a cardholder using a contactless card for selective communication. These examples are intended solely for explanatory purposes and not limitation. In one case, a cardholder seeks to pay a merchant for items purchased at the merchant's store. When the merchant rings up the item on the register (e.g., point-of-sale device 150), a total is presented to the cardholder. The cardholder takes his credit card (e.g., card 120*a-b*) out his wallet and taps it against the digital card reader associated with the register. Once the card taps the digital reader, communication between the digital card reader and the card is initiated. The card recognizes the data sent from the digital card reader as being consistent with an EMV data standard. In response, an application on the card solely responsible for communicating data associated with the EMV data standard transmits only payment data (e.g. data required for facilitating payment) to the digital reader associated with the register. The register receives the payment data and processes the payment. Because the credit card only transmitted payment data, the cardholder is afforded a more secure transaction as data unrelated to the transaction is not transmitted.

In another case, a cardholder seeks to login to a banking app associated with his debit card. The banking app may require multi-level authentication, i.e., first level authentication requires a username/password combination or some form of biometric data (e.g., optical data, face recognition, thumbprint data) and second level authentication requires identity data associated with the card (e.g., first and last name, social security information) to match at least some of the first level authentication data. The cardholder taps his debit card against a digital reader associated with his smartphone (e.g., mobile device 140). Once the debit card taps the digital reader, communication between the digital card reader and the debit card is initiated. The debit card recognizes the data sent from the digital card reader as being consistent with an NDEF data standard. In response, an application on the debit card solely responsible for communicating data associated with the NDEF data standard transmits only identification data (e.g., data required for facilitating identification/authentication purposes) to the digital reader associated with the smartphone. The smartphone, via an application, receives the identification data and authenticates the cardholder's identity (e.g., compares the identification data to first level authentication data). Because the debit card only transmitted identification data, the cardholder is afforded a more secure transaction as data unrelated to authentication is not transmitted.

We claim:

1. A transaction instrument comprising:

a passive proximity circuit communication interface;

one or more processors; and non-transitory memory in communication with the one or more processors and storing instructions that, when executed, are configured to cause the transaction instrument to:

store preloaded data prior to issuance of the transaction instrument, the preloaded data being associated with a cardholder profile prior to issuance of the transaction instrument and comprising or being usable by the transaction instrument to generate at least one key;

receive, via the communication interface, first data of a first data type, the first data type corresponding to an authentication communication;

generate, via a first application configured to process data of the first data type and using the at least one key, a first response to the first data, the first response being usable to activate the transaction instrument for payment transactions;

transmit, via the communication interface, the first response;

after the transaction instrument is activated for payment transactions using the first response, receive, via the communication interface, second data of a second data type, the second data type corresponding to a payment communication;

generate, via a second application configured to process data of the second data type, a second response to the second data; and transmit, via the communication interface, the second response.

2. The transaction instrument of claim 1, wherein:

the transaction instrument is a contactless payment card, the communication interface comprises a near field communication (NFC) interface, the authentication communication is a non-payment communication, the first response is transmitted to a mobile device to authenticate an identity of a user, the second response comprises Europay-Mastercard-Visa (EMV) payment data, the second response is transmitted to one or more point-of sale devices, and the payment transactions comprise one or more of commercial transactions, EMV transactions, or combinations thereof.

3. The transaction instrument of claim 2, wherein:

authenticating the identity of the user is used to access a mobile application on the mobile device, access restricted options in the mobile application on the mobile device, as a factor in a multi-factor authentication request, or combinations thereof.

4. The transaction instrument of claim 2, wherein:

the first application is unable to access the second data or the second response to the second data, and the second application is unable to access the first data or the first response to the first data.

5. The transaction instrument of claim 4, wherein:

the at least one key comprises a key pair, and the first data comprises instructions to generate a digital signature.

6. The transaction instrument of claim 5, wherein:

generating the first response comprises generating the digital signature using a private key of the key pair, and the first response comprises the digital signature.

7. The transaction instrument of claim 6, wherein:

storing the preloaded data prior to issuance of the transaction instrument comprises storing the preloaded data during personalization or pre-personalization of the transaction instrument, and the preloaded data comprises the private key.

8. The transaction instrument of claim 6, wherein the instructions are further configured to cause the transaction instrument to generate the private key from the preloaded data.

9. A method comprising:

storing a first application on a transaction instrument prior to issuance of the transaction instrument to a rightful cardholder, the first application being configured to process data of a first data type;

storing a second application on the transaction instrument prior to issuance of the transaction instrument to the rightful cardholder, the second application being configured to process data of a second data type different from the first data type;

storing preloaded data in or in association with the first application on the transaction instrument prior to issuance of the transaction instrument to the rightful cardholder, the preloaded data comprising or being associated with one or more keys;

associating the preloaded data with an account of the rightful cardholder prior to issuance of the transaction instrument to the rightful cardholder;

receiving, via a passive proximity circuit communication interface of the transaction instrument, first data of the first data type corresponding to an authentication communication operable to activate the transaction instrument for payment transactions;

generating, via the first application of the transaction instrument, a first response to the first data using the one or more keys;

transmitting, via the communication interface, the first response;

after the transaction instrument is activated for payment transactions using the first response, receiving, via the communication interface, second data of the second data type corresponding to an Europay-Mastercard-Visa (EMV) transaction;

generating, via the second application of the transaction instrument, a second response to the second data; and transmitting, via the communication interface, the second response.

10. The method of claim 9, wherein:

the transaction instrument is a contactless payment card displaying identification information associated with the rightful cardholder, the first response is transmitted to a mobile device associated with the rightful cardholder to authenticate an identity of the rightful cardholder, and the second response comprises EMV payment data.

11. The method of claim 10, wherein:

the one or more keys comprises a key pair, the first data comprises instructions to generate a digital signature corresponding to a public key of the key pair, generating the first response comprises generating the digital signature using a private key of the key pair, and the first response comprises the digital signature.

12. The method of claim 11, further comprising:

generating the key pair using the preloaded data, and wherein:

the payment transactions comprise one or more of commercial transactions, EMV transactions, or combinations thereof, and the second response is generated in connection with an EMV transaction at a point-of-sale device.

13. The method of claim 11, further comprising storing preloaded payment data in or in association with the second application on the transaction instrument prior to issuance of the transaction instrument to the rightful cardholder, wherein:

the preloaded payment data comprising or being associated with one or more payment keys for EMV transactions, the second application cannot access the preloaded data or the one or more keys, and the first application cannot access the payment preloaded data or the one or more payment keys.

14. The method of claim 10, wherein authenticating the identity of the cardholder is used to access a mobile application on the mobile device, access restricted options in the mobile application on the mobile device, as a factor in a multi-factor authentication request, or combinations thereof.

15. A transaction instrument comprising:

a passive proximity circuit communication interface;

one or more processors; and non-transitory memory in communication with the one or more processors and storing instructions that, when executed, configured to cause the transaction instrument to:

store, via a first portion of the instructions in the non-transitory memory configured to process authentication communications, a first application and preloaded data before issuance of the transaction instrument, the preloaded data being associated with an account of a rightful cardholder before issuance of the transaction instrument;

store, via a second portion of the instructions in the non-transitory memory configured to process payment communications, a second application;

receive, via the communication interface, an authentication communication;

generate, via the first application, a first response to the authentication communication using a private key in or generated from the preloaded data, the first response comprising a digital signature;

transmit, via the communication interface, the first response;

receive, via the communication interface, a payment communication;

generate, via the second application, a second response to the payment communication comprising Europay-Mastercard-Visa (EMV) payment data; and transmit, via the communication interface, the second response.

16. The transaction instrument of claim 15, wherein:

the transaction instrument is a contactless payment card, the communication interface comprises a near field communication (NFC) interface, the first portion of the instructions is unable to access the second portion of the instructions, the second portion of the instructions is unable to access the first portion of the instructions, the second response is transmitted to a point-of-sale device, the first response is transmitted to a mobile device associated with the cardholder to authenticate an identity of the cardholder, authenticating the identity of the cardholder is used to activate the transaction instrument for payment transactions, the payment communication is received after the transaction instrument is activated for payment transactions using the first response, and the payment transactions comprise one or more of commercial transactions, EMV transactions, or combinations thereof.

17. The transaction instrument of claim 16, wherein:

the private key and a public key form a key pair, and the authentication communication comprises instructions to generate the digital signature corresponding to the public key.

18. The transaction instrument of claim 17, wherein the instructions are further configured to cause the transaction instrument to:

generate the key pair using the preloaded data; and store the key pair in or in association with the second portion of the instructions.

19. The transaction instrument of claim 17, wherein the preloaded data comprises the key pair.

20. The transaction instrument of claim 16, wherein:

the preloaded data comprises a unique identifier, the private key is generated from the unique identifier, the unique identifier is associated with the first application before issuance of the transaction instrument, and the unique identifier is associated with an account of a rightful cardholder before issuance of the transaction instrument.

* * * * *